United States Patent [19]

Zylstra

[11] Patent Number: 4,486,803
[45] Date of Patent: Dec. 4, 1984

[54] ELECTRONIC SYSTEM FOR HIGH AMPERAGE CIRCUIT INTERRUPTION APPARATUS

[75] Inventor: Henry J. Zylstra, Alburnette, Iowa

[73] Assignee: Square D Company, Palatine, Ill.

[21] Appl. No.: 493,115

[22] Filed: May 9, 1983

[51] Int. Cl.³ .............................................. H02H 3/093
[52] U.S. Cl. ......................................... 361/95; 361/96; 340/644; 340/594
[58] Field of Search .................. 361/94, 95, 96, 97, 361/105, 93, 115, 67, 68, 64; 340/644, 584, 594

[56] References Cited

U.S. PATENT DOCUMENTS

| | | | |
|---|---|---|---|
| 4,000,446 | 12/1976 | Vandevier et al. | 361/96 X |
| 4,259,706 | 3/1981 | Zocholl | 361/96 |
| 4,327,391 | 4/1982 | Grzebielski | 361/96 X |
| 4,377,837 | 3/1983 | Matsko et al. | 361/105 |

*Primary Examiner*—Patrick R. Salce
*Attorney, Agent, or Firm*—Norton Lesser; Larry I. Golden; Richard T. Guttman

[57] ABSTRACT

An electronic system for a high amperage molded case circuit breaker employing a voltage to frequency converter circuit for transforming fault current levels to a number of pulses corresponding to the fault level. The pulses are applied to a long time delay and short time delay circuit respectively which integrates the pulses to provide an output in a time period inversely proportional to the fault level. The long time circuit is provided with a second stage activated for a selected time by each output of the respective first stage to further count the pulses and provide a long time delay output in a time period inversely proportional to the square of the fault current. A variable resistance power supply provides a fixed voltage drop across the current transformer output to facilitate changes in breaker rating with a simple rating resistor change. A bimetal switch is also employed to sense the temperature adjacent the breaker contacts.

8 Claims, 8 Drawing Figures

ELECTRONIC SYSTEM FOR HIGH AMPERAGE CIRCUIT INTERRUPTION APPARATUS

FIELD OF THE INVENTION

This invention relates in general to an electronic system for circuit interruption apparatus and more particularly to improved or more economical circuit breaker electronic control apparatus for use in a molded case breaker.

SUMMARY OF THE PRIOR ART

A circuit breaker utilizing electronic devices offers advantages in the sensing and detection of different fault current conditions so that the breaker may trip in response to any of three types of different fault current levels generally referred to as long time delay, short time delay and instantaneous trip levels. One example of a circuit breaker employing electronic devices to provide such functions is shown in U.S. Pat. No. 4,209,818.

The long time delay trip level corresponds to a range of moderate overload currents for which the time delay is inversely related to $i^2t$. By delaying tripping either the fault may clear, if it is temporary, or a downstream breaker may be permitted to first trip before allowing the upstream or main breaker to open its contacts to thereby avoid shutting down an entire system. The short time delay trip level corresponds to higher fault current levels than the long time delay trip level wherefore it is desirable to trip the breaker after a shorter time delay then the long time delay trip level, but still allow some time for the situation to either clear or a downstream breaker to operate. The short time delay trip level is therefore inversely related to the first power of it.

The instantaneous trip level is chosen for those current levels at which it would be dangerous to allow the breaker to continue to pass current and therefore the breaker is operated instantaneously on sensing such high current levels.

Providing economic circuits, which respond accurately to the various trip levels and which are capable of use with a wide range of breaker frame sizes and which provide the customer with a wide selection of functions has presented problems.

Ground fault circuits for sensing and detecting ground fault currents are also employed in circuit breakers of the type described and in the aforementioned patent. The ground fault circuits must likewise be arranged to provide the customer with a range of selections of the level at which a selected ground fault current should trip the breaker and a selection of the time period in which the ground fault current is present before tripping the breaker and should be capable of use over a wide range of breaker frame size or current ratings.

Since the current transformers utilized for sensing currents in the line conductors may saturate when the breaker contacts initially close or close on a fault, for example, a momentary surge or ringing current of substantial magnitude may be applied to the ground fault circuits resulting in a ground fault tripping of the breaker unless the ground fault circuit is effectively desensitized for a time period sufficient for the current transformers to desaturate.

In order for the breaker to function either as an upstream or downstream breaker, it is desirable for the breaker to be optionally restrained from tripping first if it is an upstream breaker, when a moderate ground fault current level appears in order to permit a downstream breaker to trip first, while also causing an upstream breaker to trip in the event a certain ground fault current level is exceeded.

High amperage circuit breakers of the type contemplated herein are rated to carry and capable of interrupting substantially, 3000 amps at 480 volts and conventionally have been iron frame or case breakers. Such breakers are adapted to be disassembled to permit inspection of the contacts, which may deteriorate as a result of a high level fault current, repeated low level fault interruption or tripping or other conditions leading to increased contact resistance and consequently to an increase in the heat energy lost in the breaker.

In molded case circuit breakers for use at the high rating such as the aforementioned rating of 3000 amps and higher rating, such disassembly is not contemplated, wherefore it is desirable to provide an indication of the contact condition without disassembly.

SUMMARY OF THE INVENTION

The circuits disclosed in the present invention are capable of use in three phase molded case circuit breakers of the type shown in simultaneously filed application Ser. Nos. 492,901, 492,905, 493,111, 493,116 all filed May 9, 1983 by Chabot, Wong and Chabot, Wong and by Cook whose disclosures are incorporated herein. The circuit breakers are rated to carry currents in respective ratings or frame sizes of, for example, 800, 1600 or 3000 amps and include current transformers sensing various fault current conditions in the line conductors. The output of the current transformers is applied to respective step up transformers having serially connected rectifier bridges in their outputs and the output of the bridges are extended through serially connected bimetal switches to the pick up circuits for the short and instantaneous time delay trip circuits and through a common resistor to a variable resistance power supply.

In addition the output of the current transformer bridge rectifiers are connected to a desensitizing circuit for the ground fault pick up circuits to a voltage amplifier circuit which feeds the long time delay pick up circuit and a voltage to frequency connector. The primary of the ground fault sensing or differential transformer is connected in parallel to the output of the current transformers and the output of its bridge rectifier is connected to a ground fault pickup circuit and is also connected to the power supply through a respective resistor.

The bimetal switches are each associated with a respective contact and in the event of local overheating at a respective contact, the respective switch opens to remove a shunt from a light emitting diode for signaling the respective fault situation at the control panel of the circuit breaker. This indicates the condition of the circuit breaker contacts without internal inspection of the breaker.

The variable resistance power supply provides a fixed voltage drop across the respective resistors in the output of the current and differential transformer bridges so that by simply changing a respective rating resistor corresponding to the rating of the breaker and connected in shunt with the current and differential transformer output resistors, the same sensed voltage is provided for breakers having different current ratings to thereby facilitate the use of a standard circuit for each breaker rating.

Respective operational amplifiers are used in the pickup circuits and one input to the amplifiers in the short time delay, instantaneous and ground fault pickup circuits is set by a reference potential derived from the power supply, while the other input thereto is derived from the respective bridge rectifiers and passed through a switch controlled resistor chain, whose value is easily controlled by the customer.

In the long time delay pickup circuit, one input to the operational amplifier is controlled by the output of the voltage amplification circuit and the other input level is selected by a switch controlled resistor chain connected between the output of the current transformer output bridges and a reference potential from the power supply.

The $i^2t$ function for the long time delay circuit is provided by a voltage to frequency converter circuit or encoder utilizing an operational amplifier which receives its input from the voltage amplification circuit, and a pair of counters. One of the counters is activated by a gate under control of the long time delay pick up circuit and when a predetermined number of pulses from the encoder are counted a second gate is opened for a predetermined time to enable the encoder to pulse the other counter so that the time period between pulsing of the other counter is reduced in accordance with the value of the sensed current to provide an output from the other counter inversely and linearly related to the square of the current.

The short time delay circuit is also provided with a counter fed by the encoder in the event a current of selected level is sensed and it provides an output inversely and linearly related to the first power of the current.

The described arrangement facilitates flexibility of the system by permitting a simple switch at the output of the counters to be utilized by a customer for selecting one of several possible counter outputs to provide a trip output corresponding to a desired time interval.

Desensitization of the ground fault signal level is provided by a pair of operational amplifiers under control of the output of the current transformers as shown in the copending application Ser. No. 493,115, filed on May 9, 1983 by Zylstra. If the current transformers saturate to generate a relatively high voltage output one of the operational amplifiers follows the output to control the other to inhibit the ground fault pickup circuit for a selected period of time. This ensures that a ground fault trip level current is not due merely to temporary saturation of the current transformers. In the event, however, that the ground fault signal is of large magnitude indicating a true ground fault, provision is made for the ground fault signal to override the inhibiting signal.

The ground fault circuit is also provided with an oscillator whose operation is initiated by the ground fault pick up circuit and a counter for counting the output pulses of the oscillator to provide time delays selectable by the customer in various increments. If the breaker is used as a downstream breaker the time increment may be set quite short, while a restraint circuit connected between the downstream breaker and an upstream breaker restrains the upstream breaker to permit the downstream breaker to trip first for clearing the fault to thereby avoid interrupting power to the entire system, if such interruption is unnecessary.

It is therefore an object of the present invention to provide an improved and more versatile economic circuit interruption apparatus utilizing electronic circuitry.

It is a further object of the present invention to provide an improved and more versatile economic indicating arrangement for indicating overtemperature conditions in a high amperage molded case circuit interruption device utilizing electronic components.

Other objects and features of the present invention will become apparent on examination of the following Specification and Claims together with the Drawings.

BRIEF DESCRIPTION OF THE DRAWINGS

FIGS. 2, 3, 4, 5, 6 and 7 illustrate the relevant details of the circuits shown in FIGS. 1 and 2.

GENERAL ORGANIZATION

Figure 1:
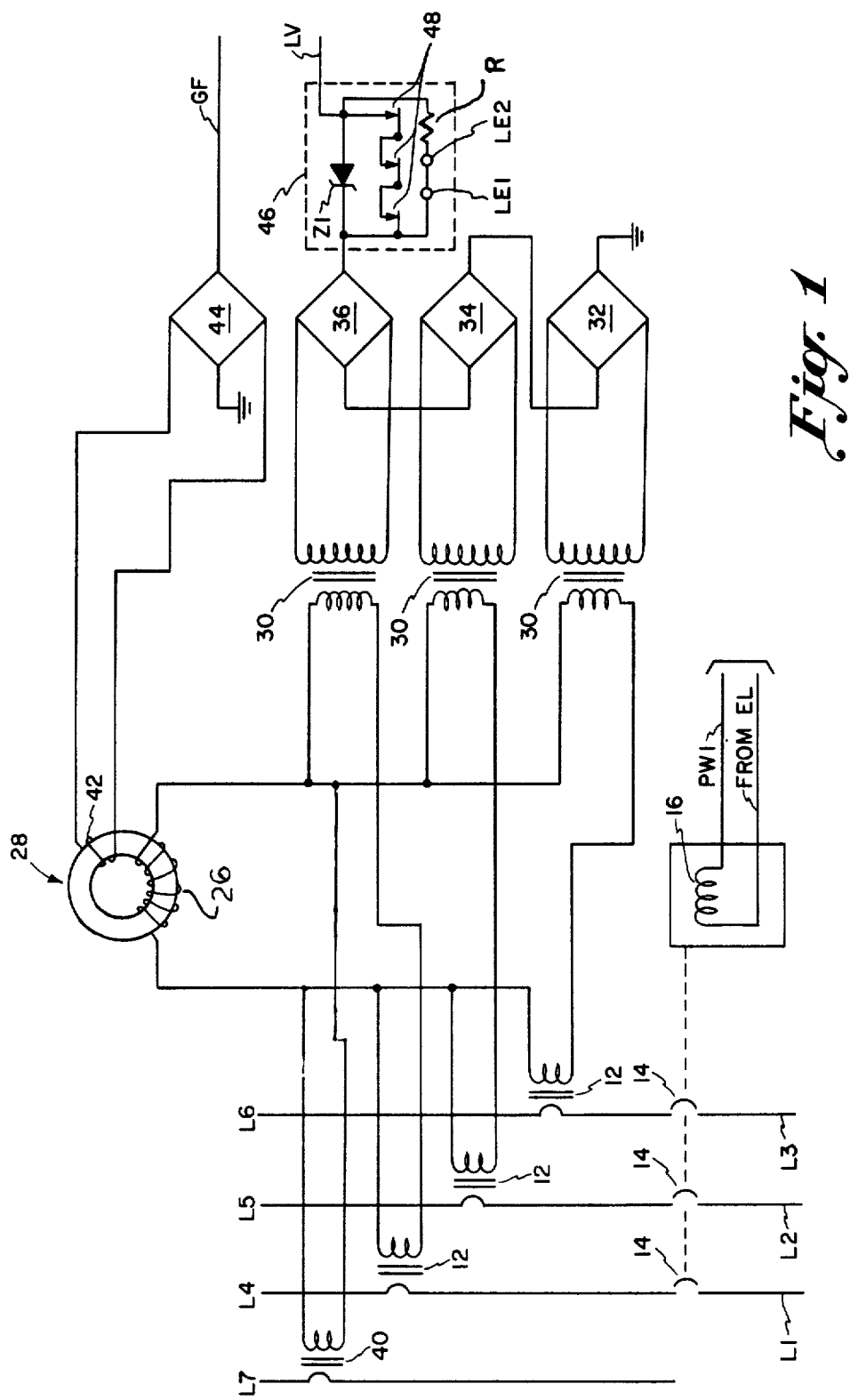
FIGS. 1 and 2 are largely block or schematic circuit diagrams illustrating the manner in which the electronic control apparatus incorporating the principles of the present invention function in a circuit breaker.
Figure 2:
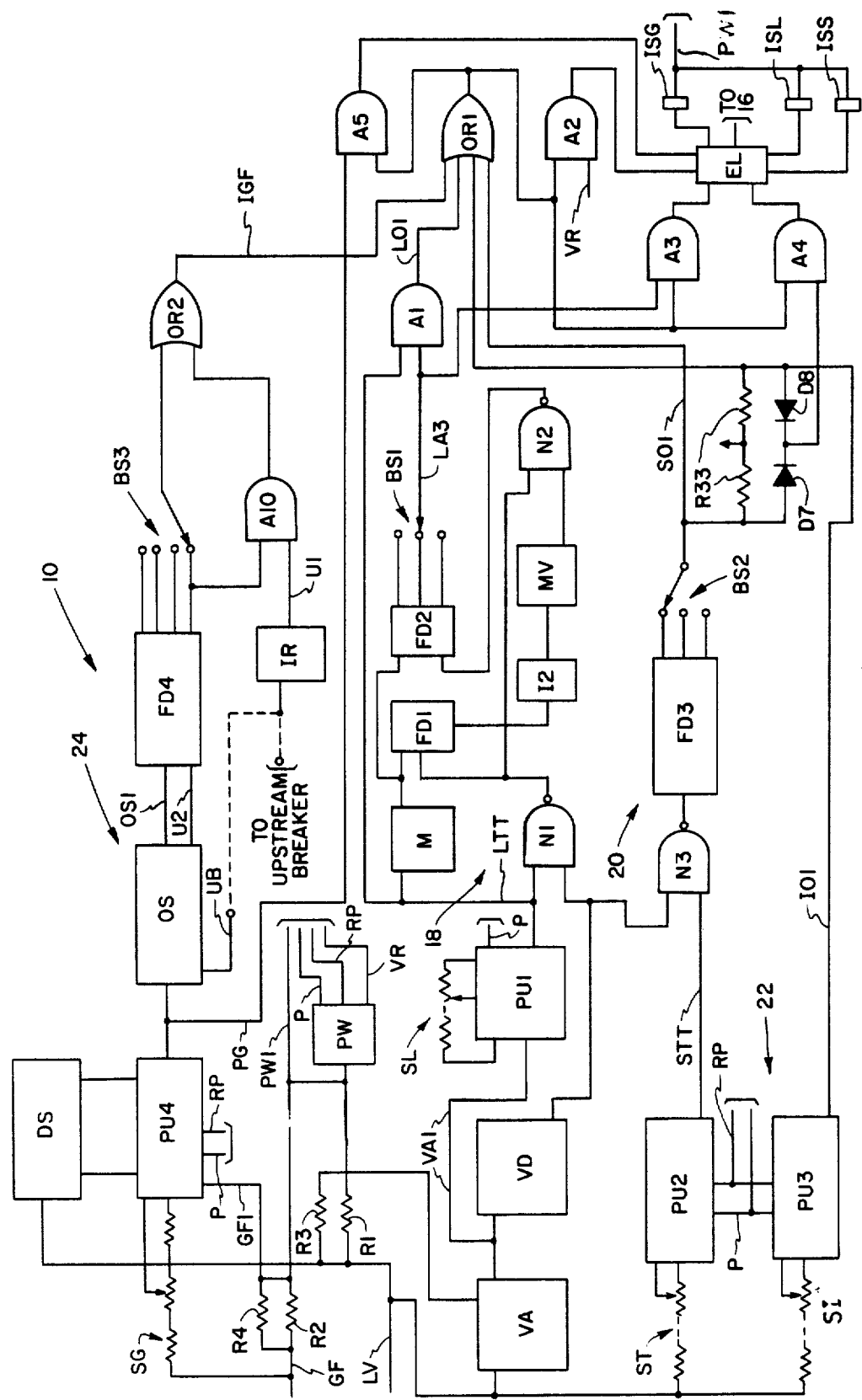

A block diagram of a circuit employing the principles of the present invention together with related apparatus is indicated in FIGS. 1 and 2 by the reference character 10. The circuit 10 is used in molded case three phase circuit breakers rated to carry currents in respective ratings or frame sizes of 800, 1200 or 3000 amps at up to 480 volts and is adapted for use over an even more extensive range circuit breaker ratings such as 250 amps and 4000 amps.

Current is extended by a breaker from three phase or line conductors L1, L2 and L3 forming the primaries of respective conventional current sensing transformers 12, after passing through respective circuit breaker contacts 14. In addition a fourth conductor or a ground bar indicated at L7 may be employed with the breaker as an additional ground or neutral in a conventional manner and provided with a current sensing transformer.

The contacts 14 are adapted to be opened by a trip solenoid 16, energized to interrupt the passage of current from the line conductors L1–L3 to the load conductors and may be either a conventional solenoid or of a type described in U.S. Pat. Nos. 4,213,165, 4,208,689; 4,215,328 or 4,209,817, for example. The trip solenoid 16 is energized for opening contacts 14 under control of either a long time delay circuit 18, a short time delay circuit 20, an instantaneous circuit 22 or a ground fault circuit 24, which are seen in detail in FIGS. 3-7.

One terminal of each current transformer 12 is connected to the same terminal of winding 26 of a differential ground fault summing transformer 28 and the other terminal of each current transformer is connected to one terminal of a respective primary of a respective step up transformer 30. The other terminal of each the primary of each step up transformer is connected to the other terminal of the ground fault transformer winding 26. The secondary of each step up transformer 30 is connected to a respective diode or rectifier bridge 32, 34 and 36.

If the ground bar L4 is used, the input to the ground fault summing transformer 28 is provided by the secondary of a current transformer 40, which senses the current in the fourth conductor or neutral bar L4 and applies on output to winding 26.

The output of transformer 28 is provided by a winding 42 and applied to a respective ground fault rectifier bridge 44.

Bridges 32, 34 and 36 are connected in series with one output terminal extending from bridge 32 to ground and the other output terminal extending from bridge 36 through a plurality of optionally connected serially arranged thermal or bimetal sensing switches indicated by block 46 in FIG. 1 to a common input signal lead LV. Lead LV provides an input to a power supply PW, an amplifying circuit VA shown in FIG. 3; to a desensitizing circuit DS in the ground fault circuit 24, and to switches ST and SI respectively controlling the short time delay and instantaneous circuits 20 and 22. Lead LV thus provides a rectified pulsating positive D.C. signal corresponding to the peak current or line voltage carried by the line conductors L1-L3.

The thermal switches 48 as shown in FIG. 1 are connected in series between the output of bridges 32-36 and lead LV and each is located preferably adjacent a respective pair of breaker contacts 14 or on a respective one of the circuit breaker terminals adjacent the contacts 14 as shown in the aforementioned simutaneously filed applications. At least three switches 48 are provided so that there is one thermal switch for each conductor or phase. The switches 48 each preferably comprises a bimetal controlling a pair of contacts, which are opened by the respective bimetal, if the associated contact or terminal temperature rises above a predetermined value to open the respective switch 48.

A pair of serially connected light emitting signal diodes LE1 and LE2 and a resistor R are connected in shunt with all of the switches 48 and a zener diode Z1 is connected in shunt with all of the switches 48 and the diodes LE1 and LE2. A metal oxide resistor MO or other voltage limiting arrangement is connected to lead LV.

If one of the switches 48 should open due to the adjacent contacts or terminal heating to a temperature above a selected or predetermined value, a voltage drop is developed across the diodes LE1 and LE2 and resistor R. The diodes and resistor are located at the control panel of the breaker. The diodes LE1 and LE2 therefore light at the panel to signal the overheated temperature condition. The zener diode Z1 prevents the voltage across the diodes LE1 and LE2 from rising above a selected value that would render the diodes LE1 and LE2 inoperable.

The ground fault diode bridge 44 has one output terminal connected to ground and the other output terminal provides a positive signal over a signal lead GF to a respective switch SG in the ground fault circuit 24 when the current induced in winding 42 does not sum to zero.

The power supply PW receives its input from lead LV and GF through a respective one of a pair of low value 68 ohm and 100 ohm respective burden resistors R1 and R2. The positive potential on lead LV or GF is applied to lead PW1 extending to one terminal of the trip solenoid 16, indicator solenoids ISL, ISS and ISG and to power supply PW.

A respective rating resistor R3 is connected in shunt with resistor R1 and a respective rating resistor R4 is connected in shunt with resistor R2. Rating resistors R3 and R4 are carried by a rating plug in the circuit breaker control panel and may thus be easily changed, as the control panel is conventionally accessible. By selection of the resistance value of the rating plug resistors R3 and R4 the potential provided on signal leads LV and GF may be controlled to provide the same potential irrespective of the current rating of the breaker to thus enable the remaining circuitry to be standardized for the mentioned breaker ratings.

Figure 3:
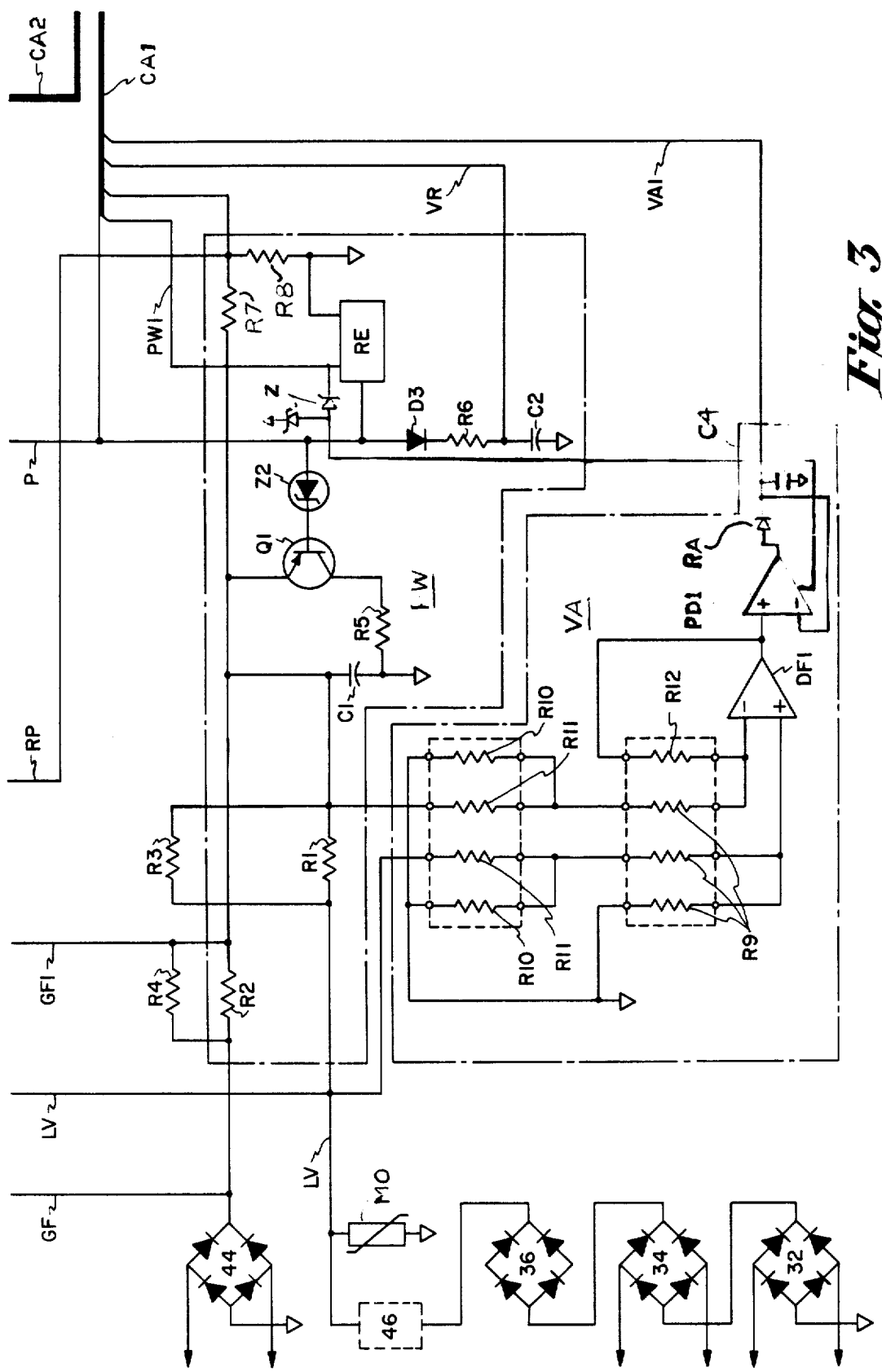

The input to power supply PW as seen in FIG. 3 includes a conventional filter capacitor C1 connected between lead PW1 and ground indicated by the triangle symbol throughout the drawings.

Capacitor C1 is connected in shunt with the collector emitter circuit of a PNP transistor Q1 having an emitter circuit connected to lead PW1 and a collector circuit connected to ground through a low value 7.5 ohm resistor R5. A conventional power supply regulator RE of a type such as 78MJOC or 7812C, for example, sold by National Semiconductor Co. and having an input connected to lead PW1, is provided to supply substantially +12 volts on output lead P extending to circuits 18, 20, 22 and 24. Lead P is connected to ground through serially connected diode D3, resistor R6 and capacitor C2. The junction of resistor R6 and capacitor C2 is connected to a lead VR to maintain the gates, counters and inverters for a selected time period in the event power should be momentarily be lost. Lead P is also connected to the anode of a zener diode Z2 whose cathode is connected to the base circuit of transistor Q1 for controlling the current passed by transistor Q1.

The input to regulator RE from lead PW1 is also connected to ground through serially connected 30K and 10K or resistors R7 and R8 respectively and their junction is connected to lead RP for furnishing a reference potential of substantially $\frac{1}{4}$ the voltage on lead PW1 to circuits 18, 20, 22 and 24. The reference potential on lead RP thus corresponds to the ratio of resistor R7 to the sum of resistors R7 and R8 or R7/R7+R8 and to the voltage on lead PW1.

Zener diode Z2, maintains the base circuit of Q1 at substantially 19.4 volts, and when a voltage rise occurs on lead GF or LV additional current flows in the collector circuit of Q1 and through the low value resistor R5, which dissipates added current. A constant voltage of substantially +20 volts is therefore maintained on lead PW1 for application to the solenoids and a voltage +12 volts on lead P and the aforementioned reference voltage on lead RP.

Each of the circuits 18, 20, 22 and 24 includes a respective pickup circuit PU1, PU2, PU3 and PU4 under control of a respective select switch SL, ST, SI and SG respectively. The switches SL, ST, SI and SG each comprises a respective plurality of serially connected resistors RA-RAn, RB-RBn, RC-RCn and RD-RDn of which none or a selected number are adapted to be conventially shunted by a respective switchblade.

The switches are all mounted on the circuit breaker control panel at the front of the circuit breaker for facile access thereto. Switches SL, ST, SI, and SG for the long time delay circuit 18, the short time delay circuit 22, the instantaneous circuit 24 and the ground fault circuit 26 respectively control the pick up value at which the respective circuit initiates operation as a desired proportion of the breaker's rating.

In addition the circuit breaker panel includes a band switch BS1 for the long time delay circuit 18, a band switch BS2 for the short time delay circuit 20 and a band switch BS3 for ground fault circuit 24 respectively to select a count proportional to time in which the respective circuit operates the trip solenoid 16 and a respective indicator solenoid ISL, ISS or ISG under control of the electronic switches indicated by box EL in response to a respective fault condition. The selections available by means of the band switches BS1 and BS2 for the circuits 18 and 20 are chosen at maximum, intermediate and minimum and each represents a selected proportion of a constant K (or count) multiplied by a selected % of rated current. The band switch BS3 provides absolute time delays selectable in 0.1 second intervals ranging from 0.1 second to 0.5 seconds.

The circuit 18 includes a pair of frequency dividers or integrators FD1 and FD2 in addition to the pickup circuit PU1. Circuit PU1 operates under control of circuit VA, which transmits a signal over lead VA1 to pickup circuit PU1 and a voltage to frequency converter VD. When the signal level on lead LV rises above a predetermined level chosen between 0.5 X and 10 X where X=nominal breaker current, circuit PU1 then supplies an output on lead LTT to a memory M, which resets dividers FD1 and FD2. Divider FD1 is thereafter supplied with pulses from circuit VD at a frequency corresponding to the voltage on lead LV through a first nand gate N1 under control of circuit PU1.

An output from divider FD1 is derived when the counter has counted a predetermined number of pulses to in turn control a monostable multivibrator MV which in turn controls a second nand gate N2 in conjunction with the pulses derived from gate N1 to step the second divider FD2. Divider FD1 thus periodically controls the multivibrator MV to periodically open gate N2 for a predetermined period and enable circuit VD to pulse counter FD2.

When divider FD2 reaches a count corresponding to the setting of switch BS1, the output is applied to and gates A1 and A3 over lead LA3. Gate A1 which also received an input from the pick up circuit PU1 over lead LTT, opens to transmit an output over lead LO1. The total count reached by counters FD1 and FD2 is a constant K and the time required to reach that count is inversely proportional to the pulse rate f supplied by circuit VD. The pulse rate in turn proportional to the current sensed by the transformers so total time is inversely proportional to the pulse rate or current and $t=Kf1^2$ where f1 is the pulse rates applied to counters FD1 and FD2 and the total count f1f2t or $f^2t=K$.

The output on lead LO1 is transmitted through an OR gate OR1 for opening an and gate A2 and operating a respective electronic switch EL1 incorporated in box EL and the trip solenoid 16. Trip solenoid 16 opens the breaker contacts 14, which interrupts the current through the breaker. Simultaneously the output from FD2 is also applied over lead LA3 to an and gate A3, which also receives the output from gate OR1 for operating a respective electronic switch incorporated in box EL and the respective indicator solenoid ISL. Solenoid ISL located on the control panel of the breaker and indicates that the tripping is due to the functioning of the Long Time Delay Circuit 18.

The solenoids are of course only energized momentarily whereafter the contacts 14 are held open and the solenoid ISL operates an indicator as explained in a simultaneously filed copending application to Zylstra and Venzke.

The short time delay circuit 20 includes a frequency divider FD3 in addition to circuit PU2. Circuit PU12 receives its input from lead LV and switch ST and when the voltage on lead LV rises above a value determined by the setting of switch S1 chosen between $2\times$ and $8\times$, circuit PU2 controls nand gate N3 over lead STT to enable divider FD3 to be pulsed or advanced from the circuit VD.

When the divider FD3 reaches a predetermined count corresponding to the setting of band switch BS2, an output is passed to OR gate OR1 over lead SO1 and to gate A4. Gate OR1 passes the signal to gate A2 for operating the trip solenoid 16 to open the contacts 14. Simultaneously and gate A4 is opened by the signal on lead SO1 and the signal from gate OR1 to control an electronic switch incorporated in box EL for operating an indicator solenoid ISS. It will be noted that the time required for counter FD3 to reach a full count is K/f3 where f3 is the pulse rate supplied by circuit VD and therefore the time is linearly related to the first power of the current sensed by the current transformers.

Solenoid ISS on operation indicates either the Short Time Delay circuit 20 or the Instantaneous Circuit 22 have detected currents of respective magnitude. It will be understood that while both circuits 20 and 22 may be provided in a single breaker, the customer at his option may prefer to use only one of the two circuits, however if it is desired to utilize both circuits separate electronic switches and indicator solenoids may be provided therefore in an obvious manner.

The Instantaneous Circuit 22 includes the pickup circuit PU3 which also receives an input from lead LV and switch S1 to furnish an output over lead IO1 when the voltage on lead LV reaches a value chosen between 2 X and 10 X where X is the nominal rated breaker current. The signal on lead I01 is transmitted to both gate OR1 and gate A4. Gate OR1 passes this output to both gates A2 and A4 to operate solenoids 16 and ISS respectively, which respectively open the breaker contacts and indicate the nature of the fault. Solenoid ISS operates as for example explained in the copending application (492,515, filed May 9, 1983) to Zylstra and Venzke to provide the trip indication.

The Ground Fault Circuit 24 is of the type shown in a simultaneously filed application by Zylstra and Jensen Ser. No. 492,516, filed on May 9, 1983, whose disclosure is incorporated herein nd includes a 200 KH oscillator OS and a counter or divider FD4 in addition to the pickup circuit PU4 and the desensitization circuit DS. Circuit PU4 receives an input from lead GF and switch SG, which serves to divide the voltge between lead GF and GF1 and initiates operation of oscillator OS, when the ground fault current reaches a level chosen in accord with the setting of switch SG.

Breakers of the type disclosed in the aforementioned applications use identical or interchangeable trip units for each breaker range or rating. In accordance with the National Electrical Code, however, a breaker with a rating of 3000 amps is required to trip in response to current levels of 40% of rated capacity or 1200 amps at the highest trip or pick up point and at 20% or 600 amps for the lowest trip or pick up point. In a low or 1600 amp breaker, the highest pick up point is 75% of 1600 amps or 1200 amps and the minimum is 20% or 320 amps. To provide the various breaker frame sizes with the breakers having the same trip units, the input to circuit PU4 through switch SG is controlled by a resistor shorting strap A at the rating plug to ensure that a 3000 amp breaker trips when a ground fault current of 1200 amps appears and another strap B is provided at the rating plug to connect lead GF1 to ground in the event the breaker is a 1600 amp breaker. Thus either strap A or strap B is connected at the factory on the rating plug in accordance with the breaker frame size to enable circuit PU4 to ensure the trip solenoid operates at a maximum of 1200 amps irrespective of frame size. The setting of switch SG to select the number of resistors RD-RDn in the input to circuit PU4 permits the trip current to be reduced to as low as 600 amps or 20% of rated current for a 3000 amps frame size breaker and 320 amps or 20% of rated current for a 1600 amp frame size breaker.

Circuit DS receives an input from lead LV and the event this signal is over a predetermined level indicating transformer saturation giving rise to a ground fault ringing current in response to initiation of current flow from the conductors L1-L3, circuit DS inhibits operation of circuit PU4.

In the event circuit PU4 is not inhibited or desensitized, it controls oscillator OS to pulse frequency divider FD4 over load OS1 to advance the divider which supplies a series of four and gates A6-A9.

The output of gates A6-A9 are selected in accordance with the setting of band switch BS3 to provide an output corresponding to any one of four time periods ranging from 0.2 to 0.5 seconds in 0.1 second increments or switch BS3 is set directly to one output of the divider which supplies a 0.1 second output directly to the switch. Additionally an output from divider FD4 is applied after 0.1 second to and gate A10, which would normally furnish an output, unless its other input is inhibited or restrained as will be explained.

The output from switch BS3 is applied to an OR gate OR2 which passes the output to gate OR1 over lead IGF. Gate OR1 opens gate A2 to operate solenoid 16 and gate OR1 also provides an output to gate A5. Gate A5 also receives an output from circuit PU4 over lead PG and gate A5 opens to energize an electronic switch EL4 incorporated in box EL to and energize the ground fault indicator solenoid ISG, which indicates the ground fault condition.

The ground fault circuit 24 therefore includes a restraint circuit IR. The restraint circuit IR is utilized in the event the breaker is the only one of its type in the system or is an upstream breaker in a system of similar breakers including downstream breakers. In the case of a momentary ground fault condition, it is desirable for the downstream breaker at which the fault occurs to clear the fault before the upstream breaker trips so that if the present breaker is used as a downstream breaker or is the only breaker of its type in the system, its ground fault signal is used to prevent gate OR2 at the upstream breaker or in its own circuitry from receiving its own ground fault signal from gate A10.

Thus the output from circuit PU4 on lead PG, is connected through lead UB indicated by dashed lines to the restraint circuit IR in the upstream breaker or in the respective breaker. The signal on lead UB controls circuit IR to inhibit gate A10 in the upstream breaker over lead U1 or in the present breaker, if lead UB is connected to its own restraint circuit to permit the ground fault signal at that breaker to operate counter FD4 for a desired period. At the upstream breaker the connection of the output of circuit PU4 at that breaker to lead UB is omitted and installed lead UB from the downstream breaker is connected directly to circuit IR. That breaker must receive a ground fault signal of sufficient duration to step counter FD4 to the position corresponding to the setting of switch BS3 in order to operate solenoids 16 and ISG at that breaker. If the breaker is the only one of its type in the system the connection of lead UB to restraint circuit IR permits the breaker to function as an upstream breaker.

If the breaker is a downstream breaker in a system of similar breakers, lead UB to the respective restraint circuit IR may be unconnected and when a signal from the circuit PU4 is applied to oscillator OS the counter or divider FD4 supplies an output on counting to 0.1 second to open and gate A10. Gate A10 passes an output pulse to gates OR2 and OR1 in sequence for operating the trip and indicator solenoids 16 and ISG respectively at that breaker. Solenoid ISG indicates that the tripping is due to the operation of the ground fault circuit, as explained in the aforementioned Zylstra and Venzke application.

DESCRIPTION OF LONG TIME DELAY & RELATED CIRCUIT OPERATION

Circuit VA seen in detail in FIG. 3 includes a differential amplifier DF1 having its noninverting and inverting inputs connected to ground through serially connected respective 390K resistors R9 and respective serially connected 10K resistors R10 and the noninverting input is connected directly to ground through a respective 390K resistor R9. The resistors R9 and R10 are also respectively connected to respective 10K resistors R11. Resistor R11 connected to the noninverting terminal of amplifier DF1 extends to lead LV and resistor R11 connected to the inverting terminal extends to the opposite terminal of the burden and rating resistors R1 and R3 respectively.

The potential corresponding to that on lead LV is therefore applied to the noninverting input of DF1, which amplifies the difference in potential appearing across parallel resistors R1 and R3.

The output of amplifier of DF1 is connected to the noninverting input of precision detector PD1 whose output extends through a rectifier RA to lead VA1 and to the inverting terminal of PD1. An output corresponding to the difference in potential appearing across the resistors R1 and R3 is applied through rectifier RA over lead VA1 to circuits PU1 and VD. Capacitor C4 connected between lead VA1 and ground is charged by the output of PD1. Circuit PD1 receives its power from lead PW1 and regulators RE with the voltage level under control of zener diodes Z.

With the described arrangement of circuit VA the voltage on lead LV normally corresponds to the highest potential appearing on the phase conductors L1-L3 and that voltage, if it corresponds to the rated current of the breaker creates a relatively low voltage drop across the burden and rating resistors R1 and R3. Amplifier DF1 provides a corresponding low output; however if the values of the pulsating D.C. potential on lead LV rises in response to a fault current on one of the phase conductors the voltage drop across R1 and R3 is amplified by DF1 and applied to detector PD1 and lead VA1. Detector PD1 follows the signal from DF1 and compensates for diode drop to permit detection in the mv range. It will be noted that if the potential on lead PW1, goes over a predetermined value transistor Q1 conducts strongly to shunt current through resistor R5 and thereby increase the voltage drop across R1 and R3 and the output of amplifier DF1.

Figure 4:
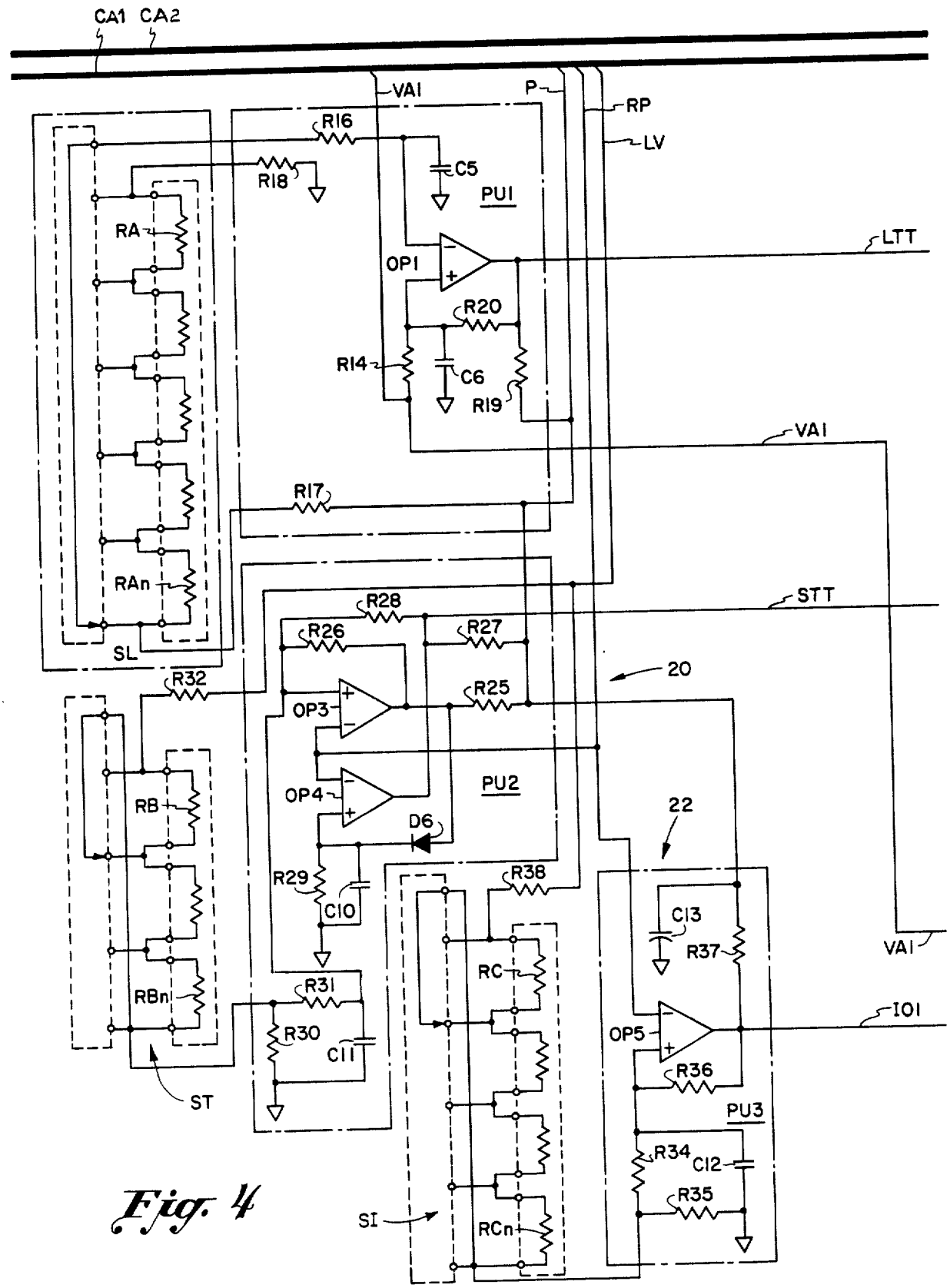
Figure 5:
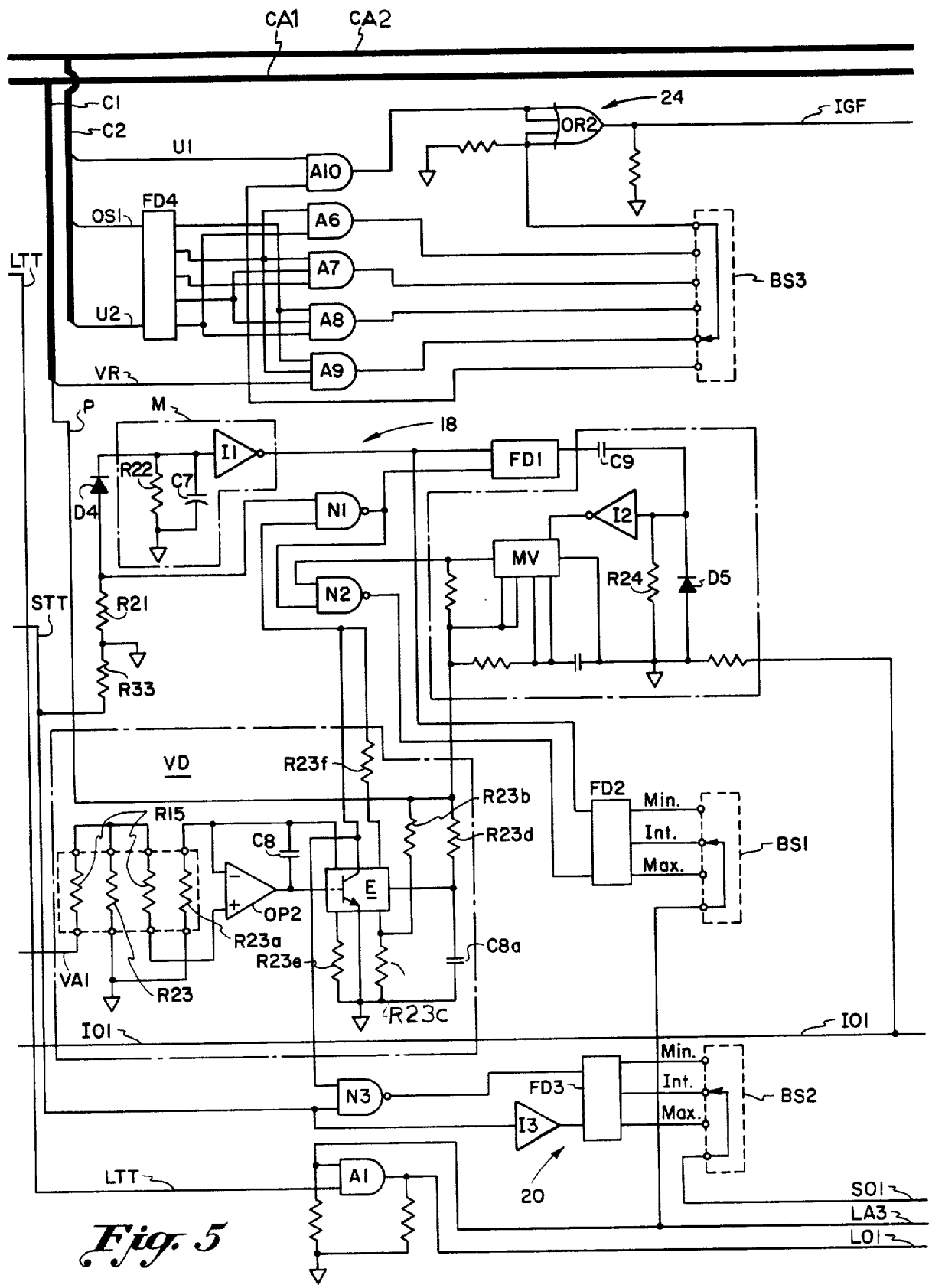
Figure 6:
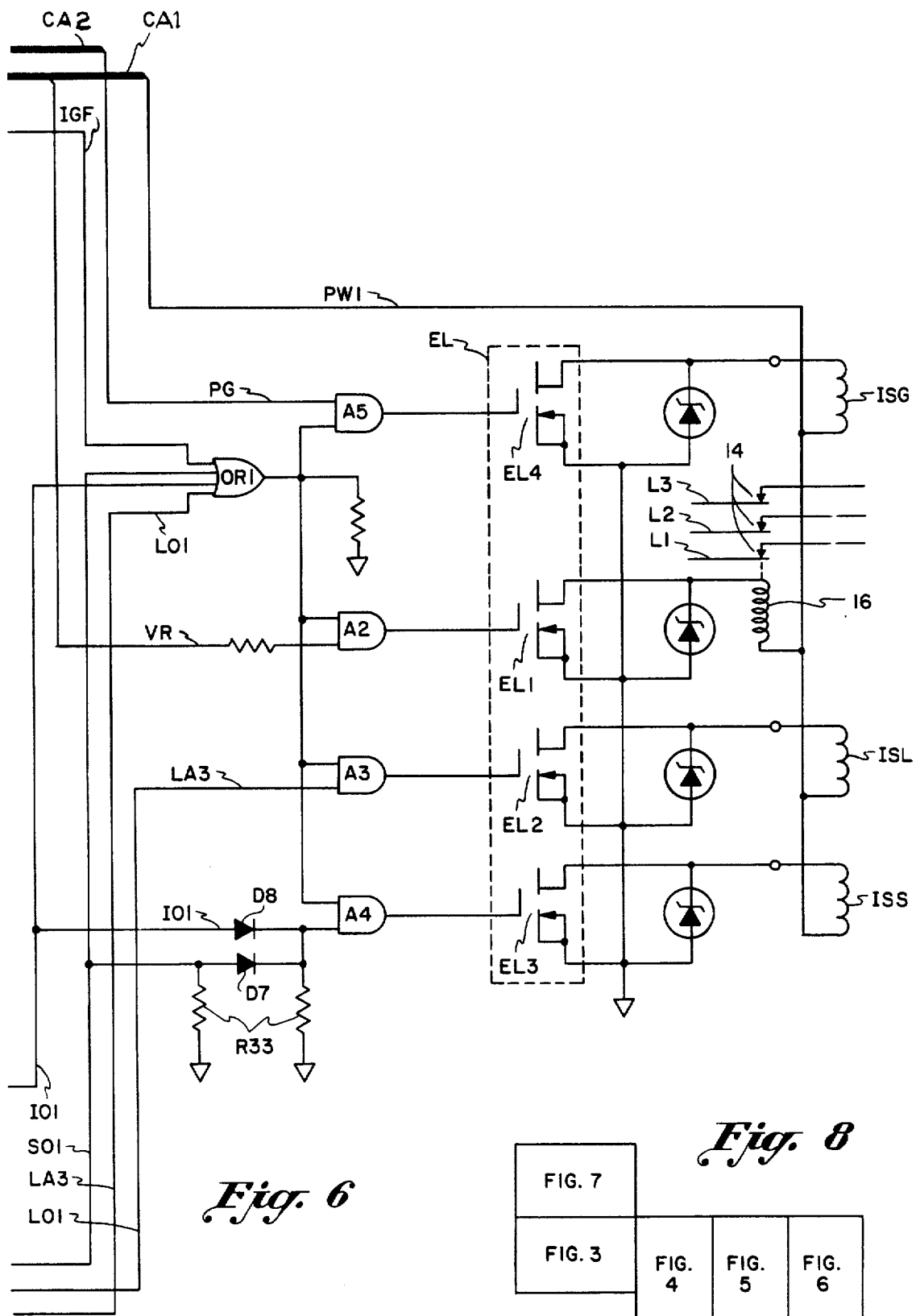
Figure 8:
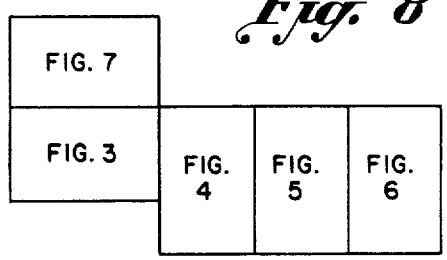
FIG. 8 is a block diagram illustrating the manner in which the circuits shown in FIGS. 3-7 are arranged.
Figure 7:
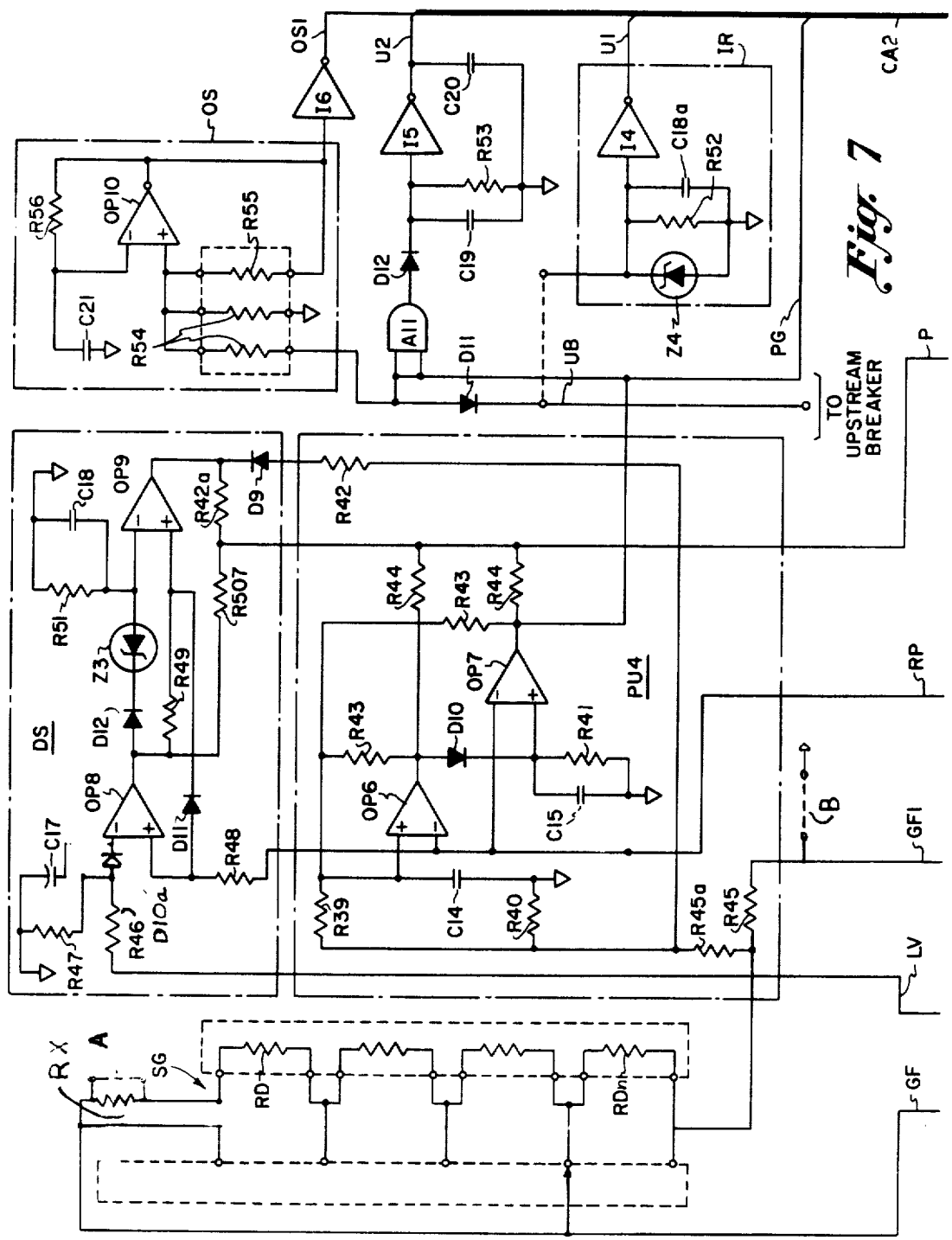

Lead VA1 extends through a cable CA1 to an 18K ohm resistor R14 and to the noninverting input of an operational amplifier or comparator OP1 in the pickup circuit PU1 seen in detail in FIG. 4 and also through a pair of serially connected 100K resistors R15 to the noninverting input of an operational amplifier OP2 in the voltage to frequency converter circuit VD seen in detail in FIG. 5.

The inverting input of amplifier OP1 is connected to ground through a bypass capacitor C5 and is also connected through resistor R16 to the switch blade of switch SL on the circuit breaker control panel. The blade in turn is set to a selected position for shunting none or one or more of a respective plurality of serially connected chain of 1K resistors or voltage dividers RA-RAn.

The chain of resistors RA-RAn are connected at one end through a 100K resistor R17 to the +12 volt supply on lead P extending through cable C1 and the other end is connected through a 5K resistor R18 to ground. Lead P is also connected to lead LTT through an 18K resistor R19 and to the noninverting input of OP1 a high value 4.7 M feedback resistor R20 connected to lead LTT and the output of OP1. A capacitor C6 connects the juncture of resistors R14 and R20 at the noninverting input of OP1 to ground. A reference voltage, which corresponds to a selected proportion of the +12 volt supply, is therefore provided by switch SL to the inverting input of OP1 and its output is normally low or close to ground. When the voltage on lead VA1 goes above that reference voltage the output of OP1 switches from low to high to apply a corresponding signal to lead LTT.

The voltage to frequency circuit VD includes the serially connected 100K resistors R15 connected from lead VA1 to the noninverting input of operational amplifier OP2 and a 100K resistor R23 connects the junction of resistors R15 to ground. The inverting input of amplifier OP2 is connected to ground through a 100K resistor R23a and is also connected to a current source provided through a voltage to frequency encoder E, while a small capacitor C8 connected between the output of OP2 and the current source is adapted to be discharged by the current source, after it is charged at linear rate to a level determined by the ratio between resistors R23b and R23c, which are 10K and 5K respectively.

The encoder E may be a type RV4151 or RM4152, for example, sold by the Raytheon and includes a comparator having an inverting input connected to the junction of resistors R23b and R23c with the noninverting input of the comparator in the encoder E connected directly to the output of OP2. The output of the comparator in the encoder E controls a one shot multivibrator in the encoder, which changes state when the charge on capacitor C8 reaches a fixed level to open the current source to enable C8 to discharge. The one shot enables C8 to discharge through the current source for a time period determined by resistor R23d and capacitor C8a and when it reaches, 0.667 of the potential on lead P, the one shot is turned off to terminate discharge. The current from the current source discharging C8 is determined by resistor R23e, which is chosen at 18K and controls the discharge current so that it is a constant equal to 2.25/18K. The output of the encoder E is supplied through a transistor in the encoder, which receives power from lead P through a 33K resistor R23f. The base is connected to the output of the one shot multivibrator, so that the transistor switches when the one shot changes state to provide an output from the encoder E which is the inverse of the one shot.

Thus capacitor C8 charges linearly to a predetermined level VT during a time period proportional to the voltage supplied by OP2 in turn dependent on the voltage on lead VA1 and LV. For example at a voltage level of twice that of a nominal value it charges to VT in 0.5 t and for a voltage level of four times a nominal value it charges to VT in 0.25 t.

The output of the comparator in the encoder is then switched when C8 charges to VT to control the one shot multivibrator in encoder E to enable the current source to discharge capacitor C8 in a fixed time. When the one shot again reverses state it controls the transistor in the encoder to provide an output pulse to gate N1. Therefore the one shot multivibrator comes on at a frequency related to the charge time of capacitor C8 required to reach VT, which in turn is related to the voltage on lead VA1 so that the encoder E provides pulses at a frequency related to the voltage on lead LV.

The pulses from the encoder E are transmitted to gates N1, and N3 and through gate N1 to counter FD1 and to gate N2, which is closed until opened by multivibrator MV. Thus as the pickup circuit PU1 switches in response to the respective overvoltage or fault current level, pulses are applied to gates N1 and N3 and permitted to pass gate N1. Each output pulse from gate N1 is fed to the input of frequency divider FD1 to advance the divider at a rate dependent on the frequency supplied by encoder E and in turn dependent on the voltage on leads VA1 and LV. Gate N2 to which the pulses from gate N1 are also applied, is held closed however until the output of monostable multivibrator MV shifts.

Frequency divider FD1 follows each pulse from gate N1 to provide one output for a selected number of input pulses, which in this case is chosen at, for example, either 2048 or 4096 input pulses. At 500 pulses per second, for example, from encoder E corresponding to the lowest nominal overvoltage or 0.002 seconds per pulse (2 ms pulse rate), divider FD1 provides an output at substantially 4 or 8 second intervals at the lowest current overvoltage level of X appearing on leads LV and VA1, while at the highest overvoltage level of 10 X, divider FD1 provides an output at substantially 0.4 or 0.8 second intervals depending on the count selected.

Each output pulse from divider FD1 is applied through capacitor C9 to the input terminal of inverter I2, whose input is connected to ground through a 33K resistor R24 and a diode D5 blocking positive pulses is connected in shunt with resistor R24. The inverter I2 in turn now applies an output pulse to monostable multivibrator MV whose output is connected to a respective terminal of gate N2 to open gate N2 for a fixed period of, for example 150 ms.

With gate N2 opened, the pulses applied from the encoder E through gate N1 during the period that MV switches gate N2, are also passed by gate N2 to frequency divider or counter FD2. When multivibrator MV resets, gate N2 is closed, so the number of pulses applied to divider FD2 is dependent on the time between output pulses from divider FD1. Divider or totalizer FD2 is selected to provide an output on either a count of 8192 or some binary submultiple, for example, on respective output leads to switch BS1. With gate N2 open for 150 ms, 75 pulses are applied at 1.5 X where X=nominal breaker current during each period gate N2 is opened and it is opened periodically as counter FD1 recycles after each count.

The time required for an output from FD1 therefore corresponds to n1/Vn where n1 is the total count provided by FD1 and Vn is proportional to the voltage on lead LV or the total number of input pulses from encoder E. The time for an output pulse from FD1 therefore is inversely proportional to the current sensed by the transformers 12 and $t=n1/f1$ where t is time; n1 is the number of pulses from E required for FD1 to read its full count and f1 is the frequency of the pulses from E and is proportional to Vn.

Thus the more often the multivibrator MV is switched on the sooner FD2 reaches a selected count and the time required for any output from FD2 is $t=n2/f1t2.n1/f1 = n2n1/f1^2t2$ where n2 is the number of output pulses for FD2 to reach a full count or total and t2 is the time between operations of multivibrator MV. Therefore the time required for dividers FD1 and FD2 to count n1 and n2 is inversely proportional to frequency squared or $(f1)^2$, and an output from FD2 is derived which is inversely proportional $V^2t$ or $i^2t$ or the voltage on lead LV and VA1. To summarize briefly the output of encoder E opens N1 periodically at a rate determined by the voltage on lead LV to pulse the frequency divider FD1 at a corresponding rate. When divider or integrator FD1 counts or totals 4096 pulses, for example, it provides an output to multivibrator MV which in turn opens gate N2 for a fixed period determined by the time constants of the multivibrator. Gate N2 now passes the pulses appearing at the output of N1 to frequency divider FD2 and when the multivibrator MV reverts to its stable condition gate N2 is closed until an output is again derived from divider FD1 to again operate the multivibrator MV for passing pulses to divider FD2.

Divider or integrator FD2 conventionally counts or totals the pulses to provide an output on respective output leads corresponding to minimum, intermediate and maximum, one of which is selected by the setting of band switch BS1 on the control panel. Divider FD2 thus provides an output on lead LA3, which may be selected from between 6 seconds and 24 seconds, for example, at 6 X where X is the nominal breaker current, by the setting of switch BS1.

The output on lead LA3 is extended to one terminal of gate A1 and to one terminal of gate A3. With a signal applied from circuit PU1 over lead LTT to the other terminal of gate A1, gate A1 now provides an output to gate OR1 over lead LO1. Gate OR1 in turn passes the signal to one terminal of gate A2 and to the other terminal of gate A3. Gates A2 and A3 each pass the respective pulse to open a respective one of the electronic switches EL1 and EL2 for respectively enabling the potential on lead PW1 to energize the trip solenoid 16 to trip the breaker and the long time delay indicator solenoid ISL to indicate the reason for the trip condition.

The switches EL1-EL4 shown in box EL may, for example, be SCRs or as shown, switches of the type sold by Siliconix Inc., 220 Laurelwood Rd., Santa Clara, Calif. and noted in the brochure VQ 1000, published 1980. Each switch EL1-EL4 opens in response to an input from respective gates A2-A5 to a respective gate electrode of switches EL1-EL4 to open a current path between the respective source electrode and drain electrode of the switches to pass current from lead PW1 through the respective solenoid 16 and a respective one of the indicator solenoids ISL, ISS and ISG for operating the respective solenoids. A respective zener diode is also connected across each electronic switch EL1-EL4 to limit the voltage thereacross.

SHORT TIME DELAY CIRCUIT OPERATION

The short time delay circuit 20 includes the short time delay pickup circuit PU2 which comprises a pair of comparators or operational amplifiers OP3 and OP4 having their inverting inputs connected to the reference voltage on lead RP.

The noninverting input of OP3 is connected to +12 volts on lead P through respective 18K and 2.2 M resistors R25 and R26 in shunt with respective 18K and 2.4 M resistors R27 and R28. The output of OP3 is connected at the juncture of resistors R25 and R26 through diode D6 to the noninverting input of OP4. The noninverting input of OP4 is connected to an RC circuit comprising 2.7 M resistor R29 and capacitor C10 and the output OP4 is connected to lead STT at the juncture of resistors R27 and R28.

The noninverting input of OP3 is also connected to ground through a 3.4K resistor R30 and an 18K resistor R31 in shunt with a capacitor C11 which provides noise suppression. The juncture of resistors R30 and R31 is connected through a selected number of a chain of 2.7K resistors RB-RBn depending on the setting of the switch ST and through a 13K resistor R32 to the potential on lead LV. Thus the voltage level on lead LV at which OP3 switches its output is determined by which number of resistors RB-RBn shunted by the setting of switch ST and this will be chosen at a value corresponding to between 200%-800% of rated breaker current.

When a signal of selected peak value appears on lead LV, comparator OP3 switches its output as the signal approaches the peak to apply a positive signal through diode D6 to the noninverting input of comparator OP4. The signal from OP3 charge capacitor C11 to substantially 12 volts and comparator OP4 switches its output to high.

Comparator OP3 maintains its ouput for substantially 2 ms corresponding to the duration of the peak, while comparator OP4 maintains its output high for substantially ½ cycle due to the charge on capacitor C11. Thereafter if the signal recedes, OP3 and OP4 return to their normal condition in the event the fault signal was only momentary. However if the following peak reaches the fault level OP3 switches its output again to hold OP4 high for an additional period so that OP4 stays on to provide a signal corresponding to the selected fault on lead STT, which is connected to ground through 100K resistor R33 and to one input of gate N3. The output from comparator OP4 is also applied over lead STT to an inverter I3. The output of I3 is applied to the reset terminal of divider FD3 to reset the divider FD3.

The juncture between R33 and ground is connected to an input terminal of gate N1 through a 100K resistor R21 and is also connected, through a diode D4 to the input of an inverter T1 in the memory M. The input of I1 is connected to ground through a high value 5.6 M resistor R22 and a capacitor C7 and the inverter I1 now applies a reset pulse to the reset terminal of divider FD1 to reset the divider. Resistor R22 and capacitor C7 provide a long time constant for inverter I1 which in turn enables inverter to control the counter for holding the count applied thereto in the event power should be momentarily lost.

Since gate N3 is also receiving pulses from encoder E under control of the circuit VA and the potential on lead VA1 as previously explained, when gate N3 opens in response to the change in output on lead STT, it passes pulses proportional to the voltage on lead LV to the frequency divider FD3. At, for example, 200% to 800% of rated current the encoder E provides a frequency output of substantially 1KH or 4KH respectively to step the counter or divider FD3 accordingly and it output in a time inversely proportional to the current on conductors L1-L3 since t=n/f where n is the count of FD3 and f is the frequency of the pulses fom E.

Switch BS2, being set to one of the output terminals maximum, intermediate or minimum of FD3, selects one of the outputs to select one of three time periods between for example 0.08 and 0.34 seconds for the divider FD3 to reach the selected count at 6 X. When the counter FD3 reaches the selected count, the switch BS2 applies the output from FD3 over lead S01 to one terminal of gate OR1.

Gate OR1 passes the output to gate A2 to render switch EL1 conductive for energizing solenoid 16. Lead SO1 is also connected through a diode D7, whose opposite terminals are connected to ground through respective 100K resistors R33, to one input of and gate A4. Gate A4 also receives an output from gate OR1 and in conjunction with the output on lead SO1 provides an output to switch EL3 to energize the short time delay indicator solenoid ISS, which operates to indicate the respective short time delay trip condition.

INSTANTANEOUS CIRCUIT

The pickup circuit PU3 in the instantaneous circuit 22 includes a comparator OP5 whose inverting input is connected to lead RP and whose noninverting input is connected to ground through an 18K resistor R34 and a 3.4K resistor R35 in shunt with capacitor C12. A 1 M resistor R36 is provided between the noninverting terminal and the output lead IO1 which is also connected through an 18K resistor R37 to a capacitor C13 charged to +12 volts on lead P.

The juncture of resistors R34 and R35 is connected to one end of the serially connected chain of 2.7K resistors RC-RCn of the respective switch SI, which can be set to selectively shunt one or more of resistors RC-RCn. The opposite end of the resistor chain RC-RCn is connected to lead LV through a 13K resistor R38 so that the peak potential on lead LV is applied to the noninverting input of OP5.

When the voltage on lead LV rises toward a peak value corresponding to a value of between 2 X-10 X of rated breaker current determined by the setting of switch SI, the output of the comparator OP5 changes to alter the potential on lead IO1. This change in potential is applied directly over lead IO1 to the gate OR1 and through diode D8 to gate A4. Gate OR1 provides a signal for operating the respective electronic switch EL1 to in turn operate the trip solenoid 16 for opening the breaker contacts and applies a signal to gate A4 to energize the switch EL3 and the instantaneous or short time indicator solenoid ISS.

It will be noted that although the short time and instantaneous circuits operate the same indicator solenoid, that these can be different solenoids and that the short time and instantaneous circuits are provided in this instance to give the customer a facile choice of the type of service desired or needed.

GROUND FAULT CIRCUIT OPERATION

The ground fault pick up circuit PU4 includes comparators OP6 and OP7 with the noninverting input of each connected to ground through a respective similar sized capacitors C14 and C15 with C14 in shunt with serially connected 18K and 11K resistors R39 and R40 and capacitor C15 in shunt with a 2.7 M resistor R41 to form an RC circuit for the noninverting input of OP7.

The juncture of resistors R39 and R40 is connected to the output from the desensitizing circuit DS through a 4K resistor R42 and a diode D9, which is blocked by +12 volts on lead P connected through an 18K resistor R42a. The inverting inputs of OP6 and OP7 are connected to the reference potential on lead RP.

The noninverting input of OP7 is also connected to the output of OP6 through a diode D10 and the noninverting input of OP6 is connected by respective 2.2 and 2.4 M resistors R43 to its own output and to the output of OP7 which are respectively connected through respective 18K resistors R44 to lead P. The output of OP7 is connected over lead PG to both inputs of a gate A11 and to the 200 KH oscillator circuit OS and over cable C2 to one terminal of gate A5 for controlling the ground fault indicator solenoid ISG.

Comparator OP6 receives its input from the potential across resistors R2 and R4 supplied over leads GF and GF1 with lead GF connected at one end to the output of bridge 44 and lead GF1 connected to the juncture of resistors R2 and R4. The other end of lead GF is connected to the switchblade of switch SG and to the chain of 2.7K resistors RD-RDn of switch SG through a 4K resistor RX. As previously explained if the breaker is a 3000 amp breaker, resistor RX is shorted at the rating plug to ensure OP6 operates if a 1200 amp ground fault current appears and lead GF is connected to the chain only through strap A. Lead GF1 is connected to the other end of the chain resistors RD-RDn through a 47K resistor R45. As also previously explained, lead GF1 is connected to ground by strap B at the rating plug to ensure OP6 operates if a 1200 amp ground fault signal appears when lead GF is connected only through resistor RX to the chain RD-RDn and the breaker is a 1600 amp frame size. The junction of resistor R45 and the last resistor RDn of switch SG connects to resistor R39 and the noninverting input of OP6 through a 43K resistor R45a. If it is desired operate at a selected percentage of the rated current less than 1200 amp, switchblade SG need only be set to select resistors RD-RDn. The minimum level is chosen at 20% of rated current to avoid noise or error problems.

Accordingly, unless an output is received from circuit DS, the output of each comparators OP6 and OP7 is low, until a signal appears on lead GF of greater magnitude than the threshold determined by the setting of switch SG, which is set to shunt none or one or more of resistors RD-RDn and RX. The peak value of that signal is selected under normal ground fault conditions to be substantially 5 volts and is applied to the noninverting input of OP6, which now switches its output for a period of several milliseconds as determined by the time constants of capacitor C14 and resistor R39.

The output from OP6 is applied through diode D10 to the noninverting input of OP6 which also now switches its output to high for a period determined by the time constants of C15 and the 2.7 M resistor R41. The time constants of C15 and R41 are selected to hold the output of OP7 high for substantially ½ cycle to enable OP6 to again respond on the next ½ cycle in the event the ground fault condition still appears on lead GF. Thus OP6 responds to each peak to hold the output of OP7 high for application to gates A10, A11 and oscillator OS in the event of a ground fault signal.

If the desensitizing circuit DS has received an input from lead LV such as may occur simultaneously with the ground fault signal on lead GF, the desensitizing circuit DS operates to prevent an output from PU4. This condition occurs in the event the differential transformer 28 has saturated as, for example, when the breaker contacts are first closed, since this may generate a signal many times the normal signal on lead LV and over six times the fault signal on lead GF.

Circuit DS includes a comparator OP8 having an inverting input connected to lead LV through a 91K resistor R46 and a rectifier D10a. A capacitor C17 is connected between ground and the inverting terminal of OP8 and an 18K resistor R47 is connected from the juncture of resistor R46 and rectifier D10a to ground. The noninverting input of OP8 is connected through 100K resistor R48 to the potential on lead RP and a diode D11 connects resistor R48 to the noninverting input of comparator OP9. The noninverting terminal of comparator OP9 is also connected through a 470K resistor R49 to the output of OP8 and through an 18K resistor R50 to the +12 volts on lead P.

The output of OP8 extends to a diode D12, which is also connected to +12 volts on lead P through resistor R50, and the diode D12 is connected to a zener diode Z3 connected to the inverting input of comparator OP9. The inverting input of comparator OP9 has an RC circuit connected thereto comprising 1 M resistor R51 and capacitor C18 and its output is connected to diode D9 and the resistor R42a.

The output of OP8 is normally high and is fed through resistor R49 and through diode D12 to hold the output of comparator OP9 high. The output of OP9 is however blocked by diode D9 allowing the potential on lead GF extended through switch SG to normally control comparator OP6.

If the potential on lead LV rises to, for example, values corresponding to 6 X where X is the rated breaker current or 68 volts, as may occur on transformer saturation, comparator OP8 goes low as this signal appears at its inverting input. The output of OP9 also goes low in response to the change in output of OP8 while capacitor C18 starts to discharge for a period determined by the time constant of C18 and R51 usually chosen at 0.5 second or substantially 30 cycles in order to permit the current transformers to recover from saturation. Thus the output of OP9 will go low until capacitor C18 charges to a level below the potential at the noninverting input whereupon OP9 returns to high.

The low output of OP9 is passed through diode D9 and resistor R42 to the noninverting input of OP6. This prevents OP6 from switching outputs for a period of 0.5 second in response to a ground fault signal on lead GF and extended through switch SG to resistor R45a, unless of course the signal on lead GF is high enough to override the low output of OP9.

The resistors R42, R45 and R45a act as a voltage divider to determine the value of a ground fault signal necessary to override the signal from the desensitization circuit through D9 and therefore selection of the relative values of these resistors preferably resistor R42 determine the level of the ground fault current which will override the output of OP9. If the ground fault signal exceeds the value selected between 20%-40% of the breaker rated current in the case of a 3000 amp breaker or 20%-75% in the case of an 1600 amp breaker by a selected amount, comparator OP6 will switch outputs irrespective of the signal from circuit DS.

The output of OP8 remains low for a period corresponding to the error or saturation signal on lead LV, but the RC circuit C18 and R51 holds the output of OP9 low for only 0.5 second to prevent an output from PU4 only during the 0.5 second period unless the ground fault signal exceeds a predetermined value as mentioned. If OP8 comes back on before C18 has discharged, indicating only a momentary error signal, the output from OP9 will also reverse and remove the desensitization signal so that the ground fault circuit may operate normally. Therefore if the ground fault signal is present on lead GF after 0.5 seconds and comparator OP9 returns to a high output, or the error signal has disappeared, or the ground fault signal exceeds a selected value, an output will be provided from PU4 to the gate A11, oscillator OS and to gate A5 over lead PG. If the ground fault exceeds 1200 A, in every case, the breaker should trip in 1.0 sec. or less.

The inputs to gate A11 are tied together and connected through a diode D11 to lead UB extending to the restraint circuit IR in an upstream breaker to inhibit that breaker, if the present breaker is used as a downstream breaker. Alternatively if the present breaker is used alone in the system, diode D11 is connected to the restraint circuit IR in the same breaker as indicated by dashed lines in FIG. 7.

Circuit IR comprises a zener diode Z4 in shunt with an RC circuit comprising a 100K resistor R52 and capacitor C18a connected to the input of an inverter I4. The output of I4 goes low in response to the signal on lead UB to condition one terminal of and gate A10 over lead U1 extending through cable C2 for preventing passage of a signal through gate A10. This prevents an output at the end of 0.1 second from counter FD4 from passing gate A10 and being applied to energize the trip solenoid 16 and the ground fault solenoid ISG at an upstream breaker or if the breaker is used alone in the system and thereby shut the system down without providing an opportunity for a downstream breaker to clear the fault.

Gate A11 in any case passes the input from PU4 through diode D12 to an inverter I5 having an RC circuit including 8.2K resistor R53 and capacitor C19 connected to its input. Inverter I5 resets the counter or divider FD4 over lead U2 extending though cable CA2 and having bypass capacitor C20 connected thereto.

The oscillator OS comprises a comparator OP10 having noninverting input connected to ground and to the signal from PU4 on lead PG through respective 100K resistors R54. The output of OP10 is connected to an inverter I6 and to both input terminals through respective 100K and 37K resistors R55 and R56 with the inverting terminal connected to capacitor C21 for controlling the oscillation frequency. This frequency is selected at 200 KH.

The oscillating output of OP10 is applied through inverter I6 and lead OS1 extending through cable C2 to the clock terminal of frequency divider FD4. Divider FD4 provides a respective output pulse at the end of 0.1 second directly to one terminal of switch BS3 and to gates A7 and A10.

Thus if the breaker is a downstream breaker and its restraint circuit IR has not been rendered operative by connection to lead UB, gate A10 has not been disabled by an appropriate output on lead U1. Gate A10 will therefore pass an output from divider FD4 at the end of 0.1 second to gate OR2 which in turn will pass the signal to gate OR1 over lead IGF. Gate OR1 operates the trip solenoid 16 and passes a signal to gate A5, which has been previously enabled by a signal from PU4 on lead PG. Gate A5 energizes the electronic switch EL5 to energize solenoid ISG. The ground fault indicator solenoid ISG at a downstream breaker therefore operates in 0.1 second to indicate the ground fault condition.

On the other hand if the breaker is an upstream breaker and the customer desires, the switch BS3 is set to the output terminal corresponding to 0.1 second output from FD4 and gate OR2, which passes the output to gate OR1 for operating the trip and ground fault indicator solenoids 16 and ISG in that time period.

Since a time delay is usually provided for an upstream breaker in order to enable the downstream breaker to clear the fault four other time intervals are provided by counter FD4, which opens gate A6 at the end of 0.2 seconds; opens gate A7 at the end of 0.3 seconds; opens gate A8 at the end of 0.4 seconds and opens gate A9 at the end of the 0.5 of a second. Each gate A6–A9 is opened at the end of a selected time period ranging between 0.2 to 0.5 second respectively and depending on the gate selected by the position of band switch BS3, an output is passed after the corresponding time interval to gate OR2 which in turn passes the pulse to gate OR1 for operating solenoid 16 and the ground fault solenoid IGS.

The foregoing is a description of an improved electrically controlled breaker whose inventive concepts are believed set forth in the accompanying claims.

I claim:

1. A circuit breaker having interruption means operable for interrupting a plurality of line conductors with each conductor having a respective current transformer for sensing the current in the respective line conductor and for deriving a signal corresponding to the overcurrent present in the respective line conductor, the improvement comprising:
    current detection means for detecting any one of a plurality of currents above a predetermined level in any one of said conductors and for generating a voltage proportional to any one of said plurality of currents,
    a voltage to frequency converter circuit operated in response to said detection for generating a plurality of pulses corresponding in frequency to a respective one of said plurality of currents,
    a first means operated in response to said detection to total a predetermined number of said pulses periodically for generating periodic outputs in a time period proportional to said frequency,
    a second means operable to total a selected number of said pulses,
    means operable by each of said periodic outputs for applying said pulses for a selected period of time to said second means for totaling said selected number of pulses with the rate at which said selected time periods occur being proportional to said frequency whereby said selected number of pulses are totaled in a time period inversely related to the square of any one of said currents detected by said current detection means,
    and last means operable in response to said second means totaling said selected number of pulses for operating said interruption means for interrupting said plurality of conductors.

2. In the breaker claimed in claim 1 third means for totaling said pulses, and respective overcurrent detection means for said third means operable in response to the passage of a current higher than a selected one of said plurality of currents for applying said pulses to said third means whereby said third means totals said pulses, and means operable in response to said third means totaling a preset number of pulses for operating said last means.

3. In the breaker claimed in claim 2, a switch for said second and third means movable to any one of a plurality of positions for selecting a respective number of pulses totaled by the respective second and third means.

4. In the breaker claimed in claim 1 in which said current detection means comprises a differential amplifier providing an output proportional to any of one of said currents and an operational amplifier providing an output in response to any one of said currents for enabling said first means.

5. The circuit breaker claimed in claim 1 in which said first means and said second means each comprise a counter.

6. A circuit breaker having any one of a plurality of different current ratings and having interruption means operable for interrupting a plurality of line conductors with each conductor having a respective current transformer for sensing the current in the respective line conductor and for deriving an output corresponding to the overcurrent present in the respective line conductor and for applying said output to a regulated power supply, the improvement comprising;
    a first resistor and a diode connecting the output of each current transformer to said power supply,
    a second resistor connected in shunt with said first resistor with said second resistor being selectable in accordance with the nominal current rating of said breaker to enable said regulated power supply to provide selected voltages irrespective of said current rating,
    an operational amplifier to which at least one of said reference voltages is applied for comparison with said output for detecting any one of a plurality of currents above a predetermined level in any one of said conductors,
    an amplifier for generating a voltage proportional to any one of said plurality of currents,
    a voltage to frequency converter circuit operated in response to said detection for generating a plurality of pulses corresponding in frequency to a respective one of said plurality of currents,
    a first means operated in response to said detection to total a predetermined number of said pulses periodically for generating periodic outputs each in a time period proportional to said frequency,
    a second means operable to total a selected number of pulses,
    means operable by each of said periodic outputs for applying said pulses for a selected period of time to said second means for totaling said selected number of pulses with the rate at which said selected time periods occur being proportional to said frequency whereby said selected number of pulses are totaled in a time period inversely related to the square of any one of said currents detected by said current detection means,
    and means operable in response to said second means totaling said selected number of pulses for operating said interruption means for interrupting said plurality of conductors.

7. A circuit breaker for use in an electrical system in which said breaker may be utilized either as an upstream or downstream breaker having interruption means operable for interrupting a plurality of line conductors and a ground fault transformer with each conductor having a respective current transformer for sensing the current in the respective line conductor and for deriving a signal corresponding to the overcurrent present in the respective line conductor and for applying a signal to said ground fault transformer for deriving a ground fault signal in the event the current in said ground fault transformer sums to a another value than zero, the improvement comprising:

a ground fault circuit for detecting any one of a plurality of ground fault currents above a predetermined level and for generating a signal in response to said ground fault current, means for generating pulses at a selected frequency in response to the detection of said ground fault current, means operated by said pulses for providing outputs at a variety of time intervals including one output corresponding to a time interval shorter than each other time interval, shorter time means operable in response to said one output corresponding to said shorter time interval for operating said interruption means, selection means optionally operable for operating said interruption means for interrupting said plurality of conductors in response to any of said outputs, and means operable by one ground fault circuit in a downstream breaker for preventing operation of said shorter time means in an upstream breaker in response to the detection of a ground fault current by said one ground fault circuit.

8. A circuit breaker having interruption means operable for interrupting a plurality of line conductors with each conductor having a respective current transformer for sensing the current in the respective line conductor and for deriving a signal corresponding to the overcurrent present in the respective line conductor, the improvement comprising:

current detection means for detecting any one of a plurality of currents above a predetermined level in any one of said conductors and for generating a voltage proportional to any one of said plurality of currents, a voltage to frequency converter circuit operated in response to said detection for generating a plurality of pulses corresponding in frequency to a respective one of said plurality of currents, a first means operated in response to said detection to total a predetermined number of said pulses periodically for generating periodic outputs in a time period proportional to said frequency, a second means operable to total a selected number of said pulses, means operable by each of said periodic outputs for applying said pulses for a selected period of time to said second means for totaling said selected number of pulses with the rate at which said selected time periods occur being proportional to said frequency whereby said selected number of pulses are totaled in a time period inversely related to the square of any one of said currents detected by said current detection means, and last means operable in response to said second means totaling said selected number of pulses for operating said interruption means for interrupting said plurality of conductors.

* * * * *